United States Patent
Gepp et al.

(10) Patent No.: US 12,117,958 B2
(45) Date of Patent: Oct. 15, 2024

(54) COMPUTING DEVICE WITH SAFE AND SECURE COUPLING BETWEEN VIRTUAL MACHINES AND PERIPHERAL COMPONENT INTERCONNECT EXPRESS DEVICE

(71) Applicant: Elektrobit Automotive GmbH, Erlangen (DE)

(72) Inventors: Helmut Gepp, Niederkreuzstetten (AT); Bekim Chilku, Vienna (AT); Georg Gaderer, Vienna (AT); Michael Ziehensack, Vienna (AT)

(73) Assignee: Elektrobit Automotive GmbH, Erlangen (DE)

( * ) Notice: Subject to any disclaimer, the term of this patent is extended or adjusted under 35 U.S.C. 154(b) by 0 days.

(21) Appl. No.: 17/319,307

(22) Filed: May 13, 2021

(65) Prior Publication Data
US 2021/0357351 A1 Nov. 18, 2021

(30) Foreign Application Priority Data

May 13, 2020 (EP) .................................... 20174515
Feb. 1, 2021 (EP) .................................... 21154477

(51) Int. Cl.
*G06F 13/42* (2006.01)
*G06F 9/455* (2018.01)
(Continued)

(52) U.S. Cl.
CPC ...... *G06F 13/4282* (2013.01); *G06F 9/45558* (2013.01); *G06F 12/10* (2013.01);
(Continued)

(58) Field of Classification Search
CPC .. G06F 13/4282; G06F 9/45558; G06F 12/10; G06F 13/28; G06F 13/4022;
(Continued)

(56) References Cited

U.S. PATENT DOCUMENTS 7,814,255 B1 * 10/2010 Deva ................... G06F 13/4081
710/10
9,432,298 B1 * 8/2016 Smith ................. H04L 49/9057
(Continued)

FOREIGN PATENT DOCUMENTS

EP 3306870 A1 4/2018

OTHER PUBLICATIONS

Kutch Patrick et al. "SR-IOV for NFV Solutions. Practical Considerations and Thoughts. Technical Brief", Feb. 23, 2017 (2017-02-23), pp. 1-42, XP093036469.
(Continued)

*Primary Examiner* — Henry Tsai
*Assistant Examiner* — Christopher A Bartels

(57) ABSTRACT

The present invention is related to a computing device (CD), in particular for automotive applications, with a safe and secure coupling between virtual machines (VMi) and a peripheral component interconnect express device (PCIe-D). The invention is further related to a vehicle comprising such a computing device (CD). The computing device (CD) comprises one or more virtual machines (VMi) and a virtual switch (VS). The virtual switch (VS) is configured to provide a safe and secure coupling between the one or more virtual machines (VMi) and at least one peripheral component interconnect express device (PCIe-D) configured to support single-root input/output virtualization, to which the computing device (CD) is connected.

19 Claims, 2 Drawing Sheets

(51) Int. Cl.
  *G06F 12/10* (2016.01)
  *G06F 13/28* (2006.01)
  *G06F 13/40* (2006.01)
  *H04L 9/40* (2022.01)

(52) U.S. Cl.
  CPC .......... *G06F 13/28* (2013.01); *G06F 13/4022* (2013.01); *H04L 63/0227* (2013.01); *G06F 2009/45579* (2013.01); *G06F 2212/152* (2013.01)

(58) Field of Classification Search
  CPC ..... G06F 2009/45579; G06F 2212/152; H04L 63/0227
  See application file for complete search history.

(56) References Cited

U.S. PATENT DOCUMENTS

| | | | |
|---|---|---|---|
| 10,157,074 B2 * | 12/2018 | Khemani | G06F 13/4022 |
| 10,162,787 B1 | 12/2018 | Paustian et al. | |
| 10,318,334 B2 * | 6/2019 | Floris van Beek van Leeuwen | G06F 13/28 |
| 10,503,687 B2 * | 12/2019 | Nash | G06F 13/24 |
| 11,750,533 B2 * | 9/2023 | Daly | H04L 45/64 |
| | | | 709/223 |
| 2014/0281106 A1 | 9/2014 | Saghi et al. | |
| 2014/0331223 A1 | 11/2014 | Lee et al. | |
| 2016/0085567 A1 * | 3/2016 | Holler | G05B 17/02 |
| | | | 718/1 |
| 2016/0188513 A1 | 6/2016 | Nair | |
| 2016/0283421 A1 * | 9/2016 | Wilson | G06F 13/28 |
| 2017/0109185 A1 * | 4/2017 | Khemani | G06F 9/455 |
| 2018/0300283 A1 * | 10/2018 | Nash | G06F 13/404 |
| 2018/0331081 A1 * | 11/2018 | Goh | H05K 3/303 |
| 2019/0012193 A1 * | 1/2019 | Van Leeuwen | G06F 9/45558 |
| 2019/0102346 A1 * | 4/2019 | Wang | G06F 16/90335 |
| 2019/0354163 A1 * | 11/2019 | Bodnaruk | G06F 13/4282 |
| 2020/0059401 A1 * | 2/2020 | Holmes | H04L 41/0803 |
| 2020/0218631 A1 * | 7/2020 | Wang | H03K 19/17704 |
| 2020/0403940 A1 * | 12/2020 | Daly | H04L 49/70 |
| 2021/0117360 A1 * | 4/2021 | Kutch | G06F 9/5083 |
| 2021/0232528 A1 * | 7/2021 | Kutch | G06F 9/45558 |
| 2022/0100692 A1 * | 3/2022 | Subbareddy | G06F 30/30 |
| 2022/0121608 A1 * | 4/2022 | Waechter | G06F 13/28 |
| 2022/0210950 A1 * | 6/2022 | Geng | H01L 23/36 |
| 2023/0089528 A1 * | 3/2023 | Oliver | G06F 9/546 |
| | | | 713/100 |
| 2023/0115114 A1 * | 4/2023 | Daly | H04L 49/90 |
| | | | 709/223 |

OTHER PUBLICATIONS

Search Report dated Jul. 16, 2021 from corresponding European patent application No. 21144477.0.
Examination Report dated Apr. 5, 2023 from corresponding European patent application No. 21144477.0.

* cited by examiner

COMPUTING DEVICE WITH SAFE AND SECURE COUPLING BETWEEN VIRTUAL MACHINES AND PERIPHERAL COMPONENT INTERCONNECT EXPRESS DEVICE

BACKGROUND

The present invention is related to a computing device, in particular for automotive applications, with a safe and secure coupling between virtual machines and a peripheral component interconnect express device. The invention is further related to a vehicle comprising such a computing device.

In the field of information technology, the use of peripheral component interconnect express (PCIe) with single-root input/output virtualization (SR-IOV) is state of the art for connecting virtual machines of servers with high data bandwidth devices, such as Ethernet switches and controllers.

For example, US 2014/0281106 A1 discloses a system including a PCIe controller coupled to a device through a nontransparent PCIe bridge. The PCIe controller is operable to direct I/O operations to the device on behalf of a host system and may be an SR-IOV PCIe controller. The system also includes a PCIe driver operable within the host system to generate I/O request descriptors that specify movement of data from the PCIe controller to the host system as well as from the host system to the PCIe controller. The PCIe controller processes the I/O request descriptors and determines which device is involved in the specified movement of data. The PCIe controller generates I/O commands that contain routing information for the device to route the data between the memory address of the host system and the memory address of the device, bypassing a memory of the PCIe controller.

Single-root input/output virtualization relieves the host from handling the high data bandwidth. Several virtual functions are provided, which are mapped to the virtual machines of the server. From the side of a PCIe device these virtual functions perform automatic bulk data transfer from and to the virtual machines. For this purpose, special hardware support of the server, e.g., an input-output memory management unit, also known as VT-d (Virtualization Technology for Directed I/O), is used for translating the switch native address space into the address scheme of the virtual machines.

For example, EP 3 306 870 A1 discloses a network virtualization configuration method. According to the method, a switch virtual machine is created, which is configured to run a virtual switch. The method includes responding to a Peripheral Component Interconnect PCI scanning of the switch virtual machine, and configuring, by using a physical function driver, a PCIe device to allocate a corresponding network resource to the switch virtual machine. The method further includes initializing the PCIe device by using the physical function driver, where a default forwarding rule of the initialized PCIe device includes setting a default forwarding port of the PCIe device to a virtual function receiving queue corresponding to the switch virtual machine.

It can be observed that computation within a car is increasing drastically. Applications behind this are automated driving, e-mobility, safety, and more comfort. To handle the increased bandwidth requirements of future automotive applications, PCIe with SR-IOV could be used for electronic control units for a local interconnection of high data bandwidth devices and computing units. However, existing solutions for PCIe with SR-IOV are not designed for the embedded systems market and, in particular, do not meet all automotive requirements. Therefore, the use of such solutions for a tight coupling of high bandwidth devices to virtual machines of automotive computing units, such as high-performance computers, is very limited. However, use of a PCIe based technology would be advantageous, as it is well known and available on typical System on Chip hardware.

BRIEF SUMMARY

It is an object of the present invention to provide a computing device, in particular for automotive applications, with a safe and secure coupling between virtual machines and a peripheral component interconnect express device.

This object is achieved by a computing device according to claim 1. The dependent claims include advantageous further developments and improvements of the present principles as described below.

According to an aspect of the invention, the computing device comprises:
  one or more virtual machines; and
  a virtual switch, wherein the virtual switch is configured
    to provide a safe and secure coupling between the one
    or more virtual machines and at least one peripheral
    component interconnect express device configured to
    support single-root input/output virtualization, to
    which the computing device is connected.

According to the invention, a virtual switch, which is independent from the virtual machines and is implemented by a dedicated software component, ensures a tight coupling of PCIe devices, such as an Automotive Ethernet Switch, to virtual machines of a computing unit in a safe, secure and efficient way. The invention uses the virtual switch and SR-IOV hardware functions of the PCIe device to overcome the limitations of existing SR-IOV implementations with regard to safety and security.

The solution according to the invention allows replacing the currently used connections between a computing unit and an Ethernet Switch based on a reduced gigabit media independent interface (RGMII) or similar interfaces, which are limited to a data rate in the order of magnitude of 1 Gbps, by PCIe connections with a bandwidth of multiple Gbps. At the same time, CPU load for frame processing is reduced, as traffic streams are connected to virtual switch ports. As such, the solution enables a more efficient communication between devices.

The solution according to the invention requires some additional overhead on the control path for the virtual switch. The data path is not affected and the overhead on the control path results in additional deterministic bounded latency required for safety and security. A further overhead that needs to be considered is the CPU load for execution of the virtual switch. However, these overheads are negligible in view of the advantages provided by the inventive solution.

In an advantageous embodiment, the virtual switch is configured to provide a spatial isolation of the communication of the one or more virtual machines. The virtual switch as an independent component is able to provide full spatial isolation of the virtual machines related to communication. For example, the virtual switch can ensure that the data to be received and transmitted by any virtual machine are write protected and read protected against any other virtual machine.

In an advantageous embodiment, the virtual switch is configured to provide a temporal isolation of bus requests of the one or more virtual machines. Using a functionality of a virtual machine manager or an input-output memory management unit, only the virtual switch gets access to the PCIe bus. PCIe requests related to virtual machines are initiated by the virtual switch. This mechanism prevents any virtual machine from intentionally or unintentionally overloading the PCIe bus.

In an advantageous embodiment, the virtual switch is configured to provide a temporal isolation of communication of the one or more virtual machines related to virtual functions. By giving the virtual switch exclusive access to the PCIe bus, the virtual switch is able to perform PCIe bus enumeration and control of the physical function of the connected device, such as an Ethernet switch. The virtual switch provides and maintains the SR-IOV virtual function queues for each virtual machine and translates SR-IOV communication requests from virtual machines into related SR-IOV virtual function requests. Furthermore, the virtual switch takes care of the mapping and forwarding of interrupt requests, thus preventing interrupt request storms towards the virtual machines. In this way, a defined bandwidth can be guaranteed for each virtual machine. No virtual machine can intentionally or unintentionally reduce the PCIe communication bandwidth of another virtual machine below its guaranteed bandwidth limit.

In an advantageous embodiment, the virtual switch is configured to program the at least one peripheral component interconnect express device to directly access a related memory of the one or more virtual machines for data transmission and reception between the one or more virtual machines and a network as well as between the one or more virtual machines. In this way, very high data throughput is achieved. The sorting of ingress traffic to their associated SR-IOV virtual function queue is preferably done on the PCIe device. In this way, the data path is optimized while spatial and temporal separation between the virtual machines is maintained.

In an advantageous embodiment, the virtual switch or a processing unit of the computing device is configured to provide address translation between a virtual address space of the one or more virtual machines and physical addresses used for direct memory access transactions. In this way, no input-output memory management unit is needed, which is typically not available for embedded devices or does not support translation for multiple virtual address spaces.

In an advantageous embodiment, the virtual switch is configured to provide a generic control path to the one or more virtual machines. In this way, the communication to the PCIe SR-IOV device is independent of the PCIe SR-IOV hardware.

In an advantageous embodiment, the virtual switch is configured to scan outgoing and incoming traffic and to trigger actions. For example, the virtual switch may be configured to enforce further network separation, such as a virtual local area network (VLAN) for Ethernet. Furthermore, the virtual switch may be configured to block traffic from unauthorized sources or sources that exceed a bandwidth limit, to mirror traffic, or to generate traffic statistics. State-of-the-art SR-IOV solutions do not provide such universal filter and action capabilities per virtual machine. For example, a VLAN filter in a native SR-IOV solution is usually implemented at the physical Ethernet switch port and not on the level of a SR-IOV virtual function or virtual machine. Thus, an individual VLAN membership of a virtual machine is supported by the virtual switch employed by the solution according to the invention, whereas it cannot be enforced by a state-of-the-art SR-IOV solution.

In an advantageous embodiment, the virtual switch is configured to provide a common time base to the one or more virtual machines. In combination with a local Ethernet Control, the time base provided by the virtual switch can be synchronized to an Ethernet network, e.g. to an Automotive Ethernet network, according to IEEE 802.1AS.

In an advantageous embodiment, the virtual switch is an extension of a virtual machine manager. Such a virtual machine manager or hypervisor is generally provided for managing and controlling the or more virtual machines.

Advantageously, a vehicle comprises a computing device according to the invention. For example, the computing device may be comprised in an automotive high-performance computer (HPC) for automated driving, connectivity, user experience, body functions, or comfort functions, or in an automotive zone controller or gateway.

Further features of the present invention will become apparent from the following description and the appended claims in conjunction with the figures.

DETAILED DESCRIPTION

Figure 1:
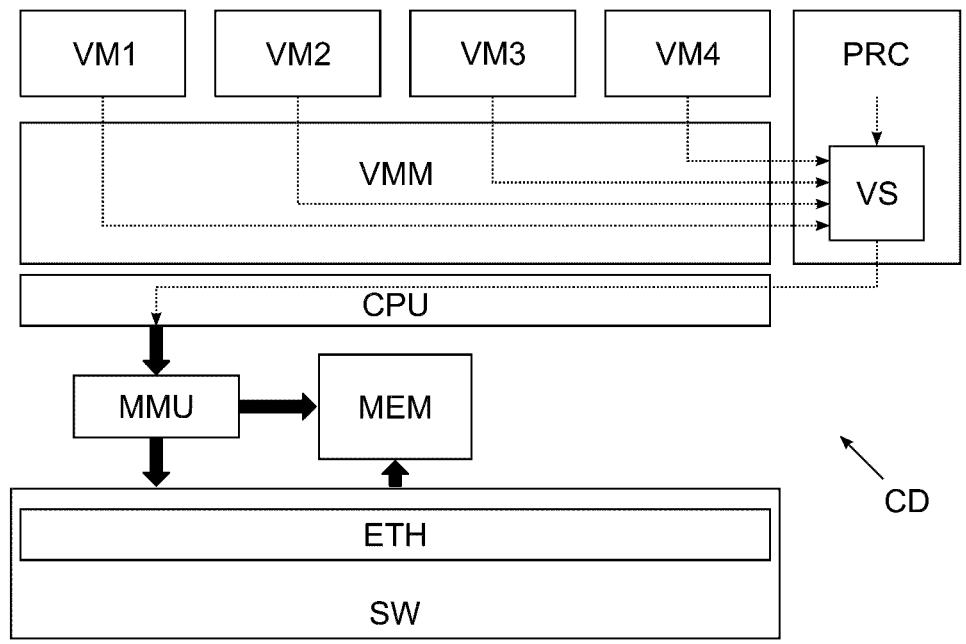
FIG. 1 schematically illustrates an architecture of a computing device using a virtual switch for connecting virtual machines to each other and to an Ethernet network.

The present description illustrates the principles of the present disclosure. It will thus be appreciated that those skilled in the art will be able to devise various arrangements that, although not explicitly described or shown herein, embody the principles of the disclosure.

All examples and conditional language recited herein are intended for educational purposes to aid the reader in understanding the principles of the disclosure and the concepts contributed by the inventor to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the diagrams presented herein represent conceptual views of illustrative circuitry embodying the principles of the disclosure.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, systems on a chip, microcontrollers, read only memory (ROM) for storing software, random access memory (RAM), and nonvolatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a combination of circuit elements that performs that function or software in any form, including, therefore, firmware, microcode or the like, combined with appropriate circuitry for executing that software to perform the function. The disclosure as defined by such claims resides in the fact that the functionalities provided by the various recited means are combined and brought together in the manner which the claims call for. It is thus regarded that any means that can provide those functionalities are equivalent to those shown herein.

When Ethernet was introduced in the automotive industry, control units were usually connected via internal Ethernet controllers to Ethernet switches. With increasing performance requirements and tighter integration of several control units, high-performance computers containing several independent virtual machines were introduced. In this case, virtual machine managers or hypervisors are used to partition several operating systems.

There are different concepts to connect virtual machines to each other and to the Ethernet network.

FIG. 1 schematically illustrates an architecture of a computing device CD using a virtual switch VS for connecting virtual machines VMi to each other and to an Ethernet network. In this example, four virtual machines VM1-VM4 are shown. The computing device CD comprises a virtual machine manager or hypervisor VMM, a dedicated processor PRC running a virtual switch VS, one or more central processing units CPU, a main memory MEM, and a memory management unit MMU. The computing device CD is connected to an Ethernet network via a switch SW with an Ethernet interface ETH. In the figure, the thin dotted arrows indicate the address paths, the thick solid arrows the address buses. The virtual switch VS is fully emulated using software.

Figure 2:
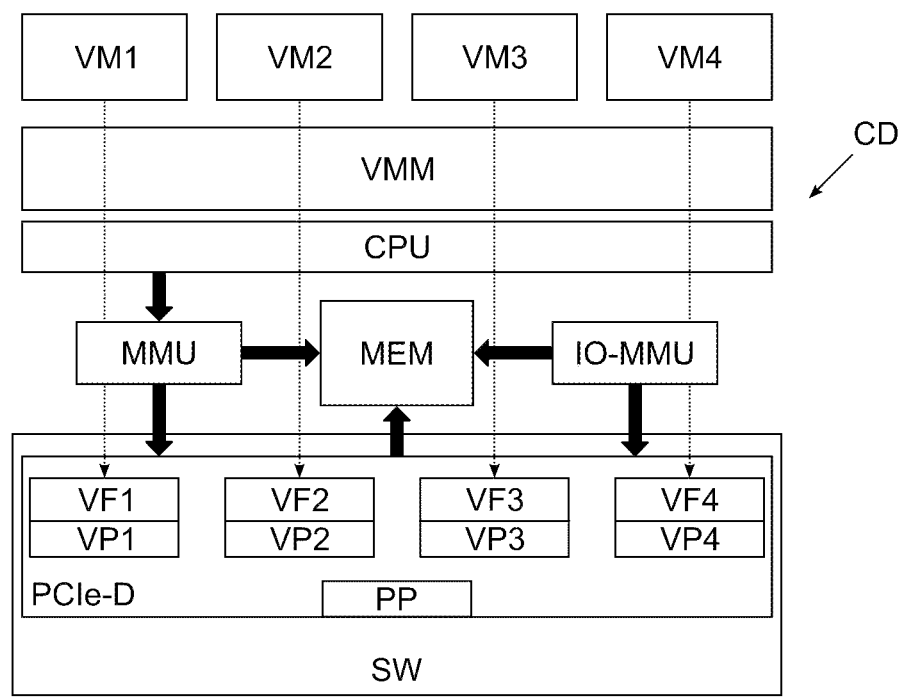
FIG. 2 schematically illustrates a common PCIe SR-IOV architecture of a computing device for connecting virtual machines to a PCIe device.

FIG. 2 schematically illustrates a common PCIe SR-IOV architecture of a computing device CD for connecting virtual machines VMi to an Ethernet switch SW. Again, four virtual machines VM1-VM4 are shown. The computing device CD comprises a virtual machine manager or hypervisor VMM, one or more central processing units CPU, a main memory MEM, a memory management unit MMU, and an input-output memory management unit IO-MMU. The computing device CD is connected to an Ethernet switch SW with a PCIe device PCIe-D that supports SR-IOV. The virtual machines VMi are mapped to respective virtual functions VFi in the PCIe device PCIe-D with associated virtual ports VPi. The PCIe device PCIe-D further comprises a physical port PP. Mapping of virtual functions VFi into virtual machines VMi happens by bypassing the virtual machine manager or hypervisor VMM. A virtual function VFi is not a full featured switch port. In the figure, the thin dotted arrows indicate the address paths, the thick solid arrows the address buses.

This architecture is originally not designed for the embedded systems market and, in particular, does not meet all automotive requirements. For example, VLAN IDs are not checked for egress traffic. Furthermore, there is no timestamping, port mirroring, or statistics counter. In addition, there are shared resources between virtual functions VFi. This may lead to the situation that the PCIe channel is overloaded by a single virtual machine VMi. Furthermore, an input-output memory management unit IO-MMU is necessary. This requires address translation for input-output devices and interrupt remapping. Without an input-output memory management unit IO-MMU, the memory protection between the virtual machines VMi might be jeopardized. The virtual machines VMi might influence each other, if SR-IOV is not protected.

Figure 3:
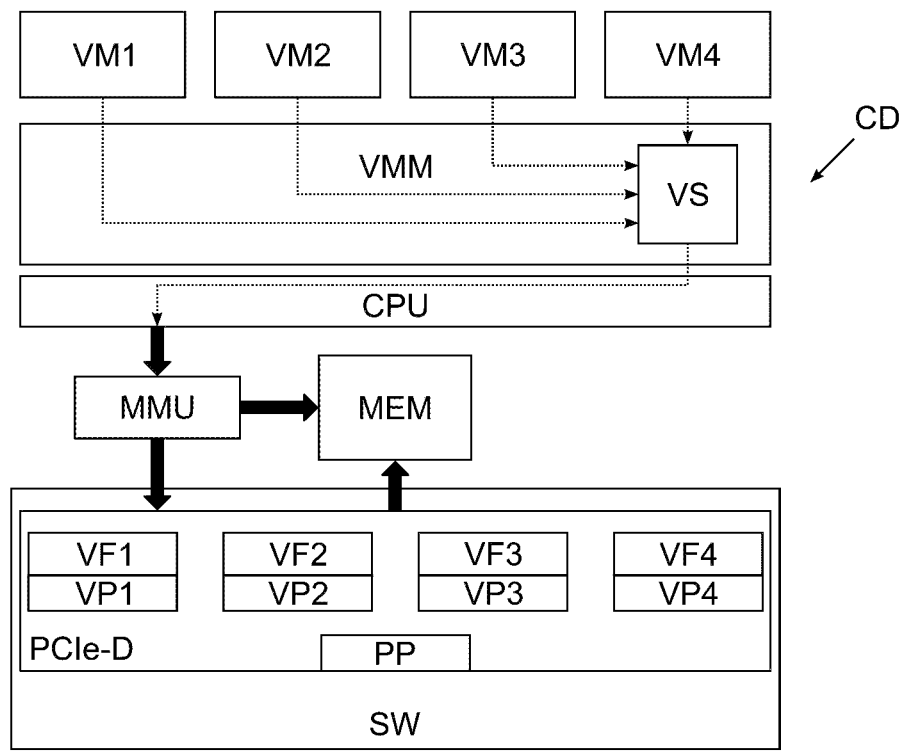
FIG. 3 schematically illustrates a PCIe SR-IOV architecture of a computing device with a virtual switch for connecting virtual machines to a PCIe device.

FIG. 3 schematically illustrates a PCIe SR-IOV architecture of a computing device CD with a virtual switch VS for connecting virtual machines VMi to an Ethernet switch SW with a PCIe device PCIe-D that supports SR-IOV. From a system point of view, the virtual switch VS extends the virtual machine manager or hypervisor VMM, is independent from the virtual machines VMi and exclusively controls the SR-IOV device on PCIe. The virtual switch VS provides temporal and spatial isolation between the virtual machines VMi and checks the VLAN for egress traffic. Furthermore, the virtual switch VS prevents occurrence of denial of service on the PCIe device PCIe-D. Also, the virtual switch VS substitutes the input-output memory management unit for address translation and removes the overhead for interrupt remapping, as polling mode is used. In addition to the features provided by the virtual switch VS, also features of SR-IOV are used. For example, the communication between the virtual machines VMi is done through the PCIe device PCIe-D. Replication of broadcast/multicast, multicast address check for ingress traffic, VLAN check for ingress traffic, traffic shaping, transmission selection between traffic classes, and sorting of the ingress traffic to the associated queue are done in the PCIe device PCIe-D.

Figure 4:
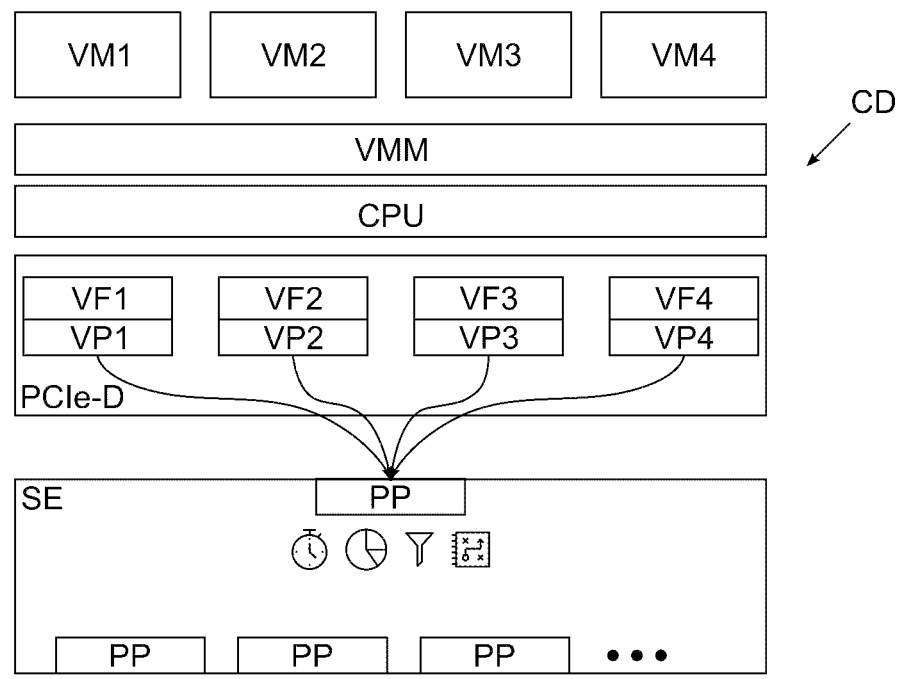
FIG. 4 schematically illustrates ingress and egress traffic scanning possibilities in a switch engine, which can be refined with a virtual switch.

FIG. 4 schematically illustrates ingress and egress traffic scanning possibilities in a switch engine SE, which can be refined with a virtual switch. In particular, these traffic scanning possibilities include timestamping, port mirroring, generating traffic statistics, and checking VLAN IDs.

The invention claimed is:

1. An automotive computing device (CD), wherein the automotive computing device is at least one of an automotive high-performance computer of a vehicle and an automotive zone controller of a vehicle, the automotive computing device comprising:
   a plurality of virtual machines (VMi); and
   a virtual switch (VS);
   characterized in that the virtual switch (VS) is an extension of a virtual machine manager (VMM) and is a single software component that is configured to provide a safe and secure coupling between the plurality of virtual machines (VMi) and at least one peripheral component interconnect express device (PCIe-D) configured to support single-root input/output virtualization, to which the computing device (CD) is connected, wherein the virtual switch (VS) exclusively controls access to the peripheral component interconnect express device (PCIe-D), wherein the virtual switch (VS) is configured to provide an isolation, with respect to time, of bus requests of the plurality of virtual machines (VMi), wherein the virtual switch is configured to provide address translation between a corresponding plurality of virtual address spaces of the plurality of virtual machines and a plurality of respective physical addresses used for direct memory access transactions thereby eliminating a need for an input-output memory management unit, wherein the virtual switch (VS) is configured to provide a spatial isolation of the communication of the plurality of virtual machines (VMi) related to communication thereby ensuring that data to be received and data to be transmitted by any of the plurality of virtual machines is write protected and read protected with respect to any other of the plurality of virtual machines, and wherein the virtual switch uses a polling mode to eliminate an overhead associated with interrupt remapping.

2. The computing device (CD) according to claim 1, wherein the virtual switch (VS) is configured to provide a temporal isolation of communication of the plurality of virtual machines (VMi) related to virtual functions (VFi).

3. The computing device (CD) according to claim 1, wherein the virtual switch (VS) is configured to program the peripheral component interconnect express device (PCIe-D) to directly access a related memory of the plurality of virtual machines (VMi) for data transmission and reception between the plurality of virtual machines (VMi) and a network as well as between the plurality of virtual machines (VMi).

4. The computing device (CD) according to claim 1, wherein the virtual switch (VS) is configured to provide a generic control path to the plurality of virtual machines (VMi).

5. The computing device (CD) according to claim 1, wherein the virtual switch (VS) is configured to scan outgoing and incoming traffic and to trigger actions.

6. The computing device (CD) according to claim 1, wherein the virtual switch (VS) is configured to enforce further network separation.

7. The computing device (CD) according to claim 1, wherein the virtual switch (VS) is configured to block traffic per virtual machine from unauthorized sources.

8. The computing device (CD) according to claim 1, wherein the virtual switch (VS) is configured to mirror traffic per virtual machine.

9. The computing device (CD) according to claim 1, wherein the virtual switch (VS) is configured to generate traffic statistics per virtual machine.

10. The computing device (CD) according to claim 1, wherein the virtual switch (VS) is configured to provide a common time base to the plurality of virtual machines (VMi) in accordance with IEEE 802.1AS.

11. The computing device (CD) according to claim 1, wherein the virtual switch (VS) is configured to block traffic from sources that exceed a bandwidth limit.

12. A vehicle, characterized in that the vehicle comprises an automotive computing device (CD) that is at least one of an automotive high-performance computer of the vehicle and an automotive zone controller of the vehicle, the vehicle comprising:
a plurality of virtual machines (VMi); and
a virtual switch (VS);
characterized in that the virtual switch (VS) is an extension of a virtual machine manager (VMM) and is a single software component that is configured to provide a safe and secure coupling between the plurality of virtual machines (VMi) and at least one peripheral component interconnect express device (PCIe-D) configured to support single-root input/output virtualization, to which the computing device (CD) is connected, wherein the virtual switch (VS) exclusively controls access to the peripheral component interconnect express device (PCIe-D), wherein the virtual switch (VS) is configured to provide an isolation, with respect to time, of bus requests of the plurality of virtual machines (VMi)), wherein the virtual switch is configured to provide address translation between a corresponding plurality of virtual address spaces of the plurality of virtual machines and a plurality of respective physical addresses used for direct memory access transactions thereby eliminating a need for an input-output memory management unit, wherein the virtual switch (VS) is configured to provide a spatial isolation of the communication of the plurality of virtual machines (VMi) related to communication thereby ensuring that data to be received and data to be transmitted by any of the plurality of virtual machines is write protected and read protected with respect to any other of the plurality of virtual machines, and wherein the virtual switch uses a polling mode to eliminate an overhead associated with interrupt remapping.

13. The vehicle according to claim 12, wherein the virtual switch (VS) is configured to provide a temporal isolation of communication of the plurality of virtual machines (VMi) related to virtual functions (VFi).

14. The vehicle according to claim 12, wherein the virtual switch (VS) is configured to program the peripheral component interconnect express device (PCIe-D) to directly access a related memory of the plurality of virtual machines (VMi) for data transmission and reception between the plurality of virtual machines (VMi) and a network as well as between the plurality of virtual machines (VMi).

15. The vehicle according to claim 12, wherein the virtual switch (VS) is configured to block traffic per virtual machine from unauthorized sources.

16. The vehicle according to claim 12, wherein the virtual switch (VS) is configured to block traffic per virtual machine from unauthorized sources.

17. The vehicle according to claim 12, wherein the virtual switch (VS) is configured to mirror traffic per virtual machine.

18. The vehicle according to claim 12, wherein the virtual switch (VS) is configured to generate traffic statistics per virtual machine.

19. The vehicle according to claim 12, wherein the virtual switch (VS) is configured to provide a common time base to the plurality of virtual machines (VMi) in accordance with IEEE 802.1AS.

* * * * *